United States Patent

Cromleigh

[15] 3,652,997

[45] Mar. 28, 1972

[54] CONTROL SYSTEM FOR MULTIPLE SIGNAL CHANNELS

[72] Inventor: Ralph G. Cromleigh, P.O. Box 751, La Canada, Calif. 91101

[22] Filed: Feb. 25, 1970

[21] Appl. No.: 13,927

[52] U.S. Cl. ....................340/172.5

[51] Int. Cl. ....................G06f 5/06, H04l 7/00

[58] Field of Search ....................340/172.5; 235/92

[56] References Cited

UNITED STATES PATENTS

| | | | |
|---|---|---|---|
| 3,497,627 | 2/1970 | Blasbalg | 340/172.5 |
| 3,417,378 | 12/1968 | Simonsen | 340/172.5 |
| 3,510,633 | 5/1970 | Kintner | 235/92 |

*Primary Examiner*—Gareth D. Shaw
*Assistant Examiner*—Ronald F. Chapuran
*Attorney*—Jackson & Jones

[57] ABSTRACT

A digital data processing system for controlling the sampling of data from, or the distribution of data to, a plurality of information channels is disclosed. The processing system includes a memory which serves to store a plurality of multibit binary syllables. Each of these multibit binary syllables includes a predetermined number of ones and zeros which define a sampling rate and a phase. The most significant bit appearing as a one defines the sampling rate, while all of the lesser significant bit positions, relative to the most significant bit appearing as a one, define the phase. A comparison circuit is employed to compare the contents of a digital counter, which is advanced at a predetermined rate, with each of the multibit binary syllables. Each valid comparison results in the generation of a sample signal by the comparison circuit, which sample signal enables the data available over a predetermined input information channel to be retrieved, extracted or otherwise sampled.

13 Claims, 7 Drawing Figures

INVENTOR.
RALPH G. CROWLEIGH
BY
Jackson & Jones
ATTORNEYS.

PATENTED MAR 28 1972

3,652,997

INVENTOR.
RALPH G. CROMLEIGH
BY
Jackson & Jones
ATTORNEYS.

INVENTOR
RALPH G. CROMLEIGH
BY
Jackson & Jones
ATTORNEYS.

INVENTOR.
RALPH G. CROMLEIGH
BY
Jackson & Jones
ATTORNEYS.

CONTROL SYSTEM FOR MULTIPLE SIGNAL CHANNELS

BACKGROUND OF THE INVENTION

1. Development of the Invention

The invention described herein was made in the performance of work under a NASA contract and is subject to the provisions of Section 305 of the National Aeronautics and Space Act of 1958, Public Law 85-568 (72 Stat. 435; 42 U.S.C. 2457).

2. Field of the Invention

This invention is generally related to data processors used in connection with systems having a plurality of information channels. More specifically, the present invention relates to digital data processing systems which are employed to control the sampling, or distribution, rates and times at which data words will be serially extracted for use from, or distributed for control of, different information channels included in a multichannel system.

3. Description of the Prior Art

Information gathering or monitoring systems which include a multiplicity of information channels over which data is provided are employed in many technical applications. Typical examples of such applications are space probes, environment test chambers, industrial assembly lines, intrusion detection systems, and the like, wherein a plurality of transducers or other appropriate sensing devices are situated to provide information concerning, for example, a particular condition.

The use of these information gathering or monitoring systems requires that the data available over the respective information channels be periodically sampled or otherwise extracted for use. Additionally, control data may be required to be distributed over the information channels to control the operation of a plurality of individual sensors, transducers, or the like. Such sampling, or distribution, of data is ordinarily done sequentially wherein the data from or to each of the information channels is serially extracted, or distributed, in a particular order during the course of a given data sequence. This data sequence is repeated for as long as the monitor information is required for evaluation or control. For purposes of this disclosure, each of these data sequences will be hereinafter referred to as a "repeatable sequence."

Occasions arise, in the use of monitoring systems, when the data provided by, or to, some of the respective information channels is to be sampled, or distributed, at a first rate while data provided over the other information channels is to be sampled, or distributed, at other different rates. This variation in data rates may be due to, for example, the nature of the information or data provided. Temperature information, for example, may vary considerably over a short span of time while information concerning humidity conditions may remain fairly uniform or constant over the same span of time.

In the prior art, the requirement for different sampling rates for the various channels is accommodated by dividing a repeatable sequence into a selected number of time slots. The sampled, or distributed, data is allocated an appropriate number of time slots to meet the desired rate. For example, if data from a first information channel is to be sampled once per repeatable sequence, then one time slot would be allocated to that data. Similarly, data from a second information channel that is to be sampled 10 times per repeatable sequence would be allocated 10 time slots that are uniformly distributed over the time duration of the repeatable sequence. As such, the sampling techniques presently used require that the time duration or length of the repeatable sequence be a function of the total number of data samples to be retrieved or extracted without significant regard to the actual number of information channels. The result is that a repeatable sequence placed in memory requires a large number of bits to be available.

As a typical example, assume that 400 sensing devices are coupled to provide, or require, information over 400 different channels. Also, assume that all or most of the channels are to be sampled, or operated, a multiplicity of times in a repeatable sequence with some channels being sampled, or operated, at higher rates than others. A repeatable sequence would then require more than 400 time slots. For example, 12,000 time slots may be required. In accordance with the prior art, 12,000 words each having perhaps 9 bits would have to be placed in storage or memory. Thus a total memory capacity of 108,000 bits would be required.

It is this requirement of large memory capacities that is eliminated or replaced by the present invention wherein only one word of increased length need be placed in storage for each information channel. If each word is increased in length to include, for example, 20 bits, then a total memory capacity of 8,000 bits for the exemplary 400 channels would be required. It may be thus readily observed that use of the present invention would result in a total memory capacity requirement reduction of 100,000 bits in the given example.

SUMMARY OF THE INVENTION

Briefly described, the present invention involves a data processing system which employs multibit words each relating to particular ones of a multiplicity of information channels over which data is provided. These multibit words respectively may include an address syllable and a phase/rate syllable. The address syllable serves to identify the channel from which data is to be retrieved, or distributed, while the phase/rate syllable serves to define the rate and times at which data is to be sampled from, or distributed to, a particular channel.

More particularly, a data processing system, in accordance with the invention, comprises a memory in which multibit words including a phase/rate syllable are stored, a memory or counter for addressing information channels, a multibit sequence counter and a comparison circuit for comparing selected bits forming the number in the sequence counter with selected bits forming the phase/rate syllables read out of memory.

The objects and many attendant advantages of this invention will be more readily appreciated as the same becomes better understood by reference to the following detailed description which is to be considered in connection with the accompanying drawings wherein like reference symbols designate like parts throughout the figures thereof.

DESCRIPTION OF THE PREFERRED EMBODIMENT

A prerequisite to appreciating this invention is an understanding of the significance and utility of phase/rate syllables. This requires an understanding of the terms "phase" and "rate" as associated with pulses generated by a binary counter and a decoding matrix.

Figure 1:
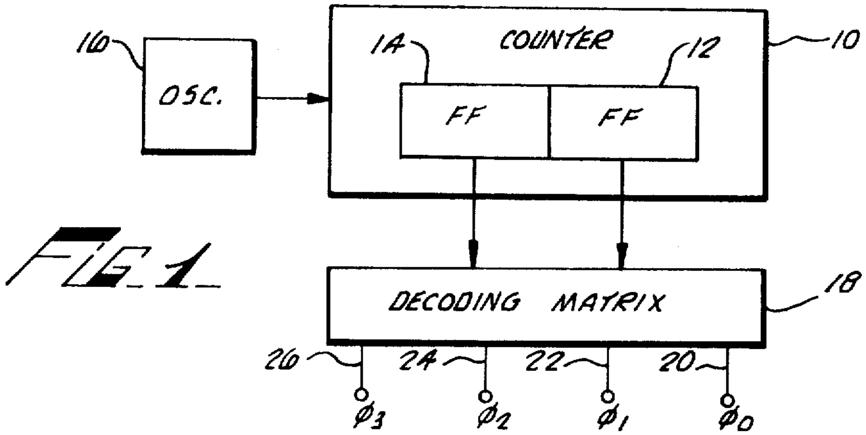
FIG. 1 is a schematic block diagram illustrating a binary counter system including two flip-flop circuits, which diagram is useful in the description of phase/rate syllables.

To this end, reference is now made to FIG. 1 which illustrates a counter system including a two-bit binary counter 10 having a pair of flip-flop circuit stages 12 and 14. The counter 10 is driven or advanced by an oscillator or clock pulse generator 16 and is capable of defining four different states. Table I, included hereinbelow, serves to set forth the four different states.

TABLE I

| Counter State | Flip-flop 14 | Flip-flop 12 | Output lines 20 | 22 | 24 | 26 | Phase |
|---|---|---|---|---|---|---|---|
| 1 | 0 | 0 | 1 | | | | 0 |
| 2 | 0 | 1 | | 1 | | | 1 |
| 3 | 1 | 0 | | | 1 | | 2 |
| 4 | 1 | 1 | | | | 1 | 3 |
| 1 | 0 | 0 | 1 | | | | 0 |
| 2 | 0 | 1 | | 1 | | | 1 |
| 3 | 1 | 0 | | | 1 | | 2 |
| 4 | 1 | 1 | | | | 1 | 3 |

A decoding matrix 18 may be employed to decode these four different states by providing an output signal over one of four output lines 20, 22, 24 or 26 for each of the four states. For example, the counter state 00 will result in an output signal being provided over the output line 20. The relationship between the counter states and the output signals appearing over the respective output lines 20, 22, 24 and 26 is shown in Table I.

Figure 2:
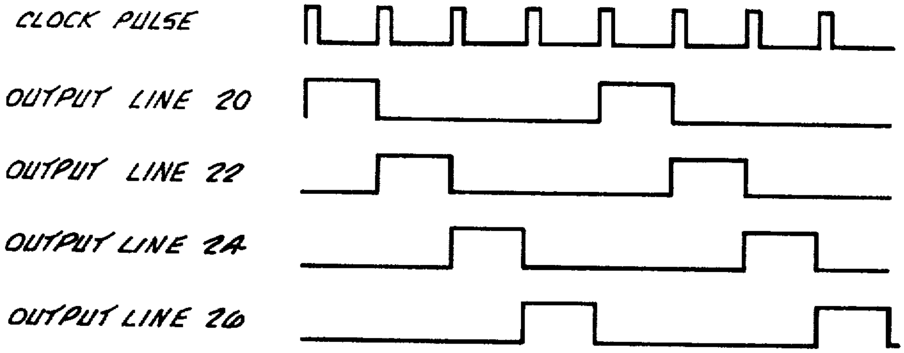
FIG. 2 is a graphic diagram illustrating waveforms associated with the binary counter system of FIG. 1.

Referring to FIG. 2, it can be observed that the output signals or pulses will appear over the respective output lines 20, 22, 24 and 26 at the same output pulse rate and that this output pulse rate is one-fourth of the clock pulse rate. For example, if the clock pulse rate is 4 pulses per second, then the output pulse rate is 1 pulse per second. Expressed in another way, if the clock pulses occur at time intervals $n$, then the output signal appearing at line 20 will occur at times $4n+0$, the output signal appearing at line 22 will occur at times $4n+1$, the output signal appearing at line 24 will occur at times $4n+2$, and the output signal appearing at line 26 will occur at times $4n+3$ in each cycle of the counter 10.

The "$4n$" term in each of the expressions used refers to and indicates the number of clock pulse time intervals that must pass before subsequent output signals will occur over the same output line. Otherwise stated, consecutive pulses will appear on any given output line only after at least four clock pulses are applied to the counter 10 of the system illustrated by FIG. 1.

The term after the plus sign (+) refers to the state or phase of the counter. In the above example, the counter 10 has four different states and can thus be described as having four phases which are sequential in character. As indicated by Table I, phase 0 corresponds to the counter state 1 which yields an output pulse over the line 20, phase 1 corresponds to the counter state 2 which yields an output pulse over the line 22, phase 2 corresponds to the counter state 3 which yields an output pulse over the line 24, and phase 3 corresponds to the counter state 4 which yields an output pulse over the line 26. There being only four different counter states, there are also only four phases in each cycle of the counter 10. Thus, phase 3 will be followed by phase 0 as each new cycle is started.

Figure 3:
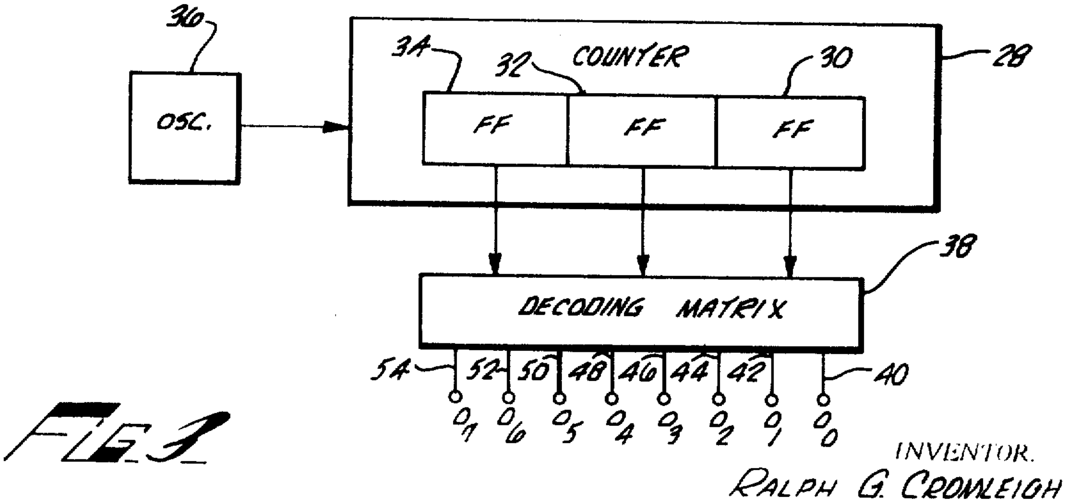
FIG. 3 is a schematic block diagram illustrating a binary counter system including three flip-flop circuits, which diagram is also useful in the description of phase/rate syllables.

In a similar manner, an eight phase counter cycle may be provided by using a three-bit counter system having three flip-flop circuit stages. Such a counter system is shown by FIG. 3 wherein a counter 28 includes three flip-flop circuit stages 30,32 and 34. An oscillator 36 serves to drive the counter 28 such that it will sequentially assume a different one of eight possible counter states. These eight counter states are shown in Table II.

TABLE II

| Flip-flop 34 | 32 | 30 | Output lines 40 | 42 | 44 | 46 | 48 | 50 | 52 | 54 | Phase |
|---|---|---|---|---|---|---|---|---|---|---|---|
| 0 | 0 | 0 | 1 | | | | | | | | 0 |
| 0 | 0 | 1 | | 1 | | | | | | | 1 |
| 0 | 1 | 0 | | | 1 | | | | | | 2 |
| 0 | 1 | 1 | | | | 1 | | | | | 3 |
| 0 | 0 | 0 | | | | | 1 | | | | 4 |
| 1 | 1 | 1 | | | | | | 1 | | | 5 |
| 1 | 1 | 0 | | | | | | | 1 | | 6 |
| 1 | 1 | 1 | | | | | | | | 1 | 7 |
| 0 | 0 | 0 | 1 | | | | | | | | 0 |
| 0 | 0 | 1 | | 1 | | | | | | | 1 |
| 0 | 1 | 0 | | | 1 | | | | | | 2 |
| 0 | 1 | 1 | | | | 1 | | | | | 3 |
| 1 | 0 | 0 | | | | | 1 | | | | 4 |

A decoding matrix 38 is employed to decode the eight counter states and provide an output signal over one of eight output lines 40, 42, 44, 46, 48, 50, 52 and 54. For example, the counter state 000 will result in an output signal being provided over output line 40. The relationship between each of the converter states and the output signals appearing over the respective output lines is shown in Table II.

Considering the counter system of FIG. 3 in light of the foregoing discussion of the counter system of FIG. 1, it can be reasoned that the cycle of the counter 28 will include eight phases and that the output signals appearing over the respective output lines 40, 42, 44, 46, 48, 50, 52 and 54 will occur at a pulse rate that is one-eighth as fast as the pulse rate of the clock pulses applied to the counter 28 by the oscillator or clock pulse generator 36.

Using the nomenclature earlier introduced, the output signals appearing over the output lines 40, 42, 44, 46, 48, 50, 52 and 54 can be expected to occur at the times $8n+0$, $8n+1$, $8n+2$, $8n+3$, $8n+4$, $8n+5$, $8n+6$ and $8n+7$, respectively.

From the earlier discussion of the two-bit counter system of FIG. 1 and the three-bit counter system of FIG. 3, it can be generalized that any output signal pulse rate of $\frac{1}{2^m}$ times the clock pulse rate, where $m$ is any integer, may be obtained by employing a counter system having $m$ flip-flop circuit stages in the counter system countdown chain.

It is important to note at this juncture, by reference to Tables I and II, that the four different states of a two-bit counter are identical to the states that can be assumed by the two least significant bits of a three-bit counter and that the four states of the two least significant bits will be repeated twice for every cycle of the eight different states associated with the three bit counter. Otherwise stated, the two least significant bits of a three-bit counter, which may be taken as representative of a two-bit counter, will be cycled twice for every cycle of the three-bit counter.

This observation is also applicable to greater numbers of counter bits. For example, where a four-bit counter is involved, the two least significant bits will be collectively advanced through their four different states for four times, and the three least significant bits will be collectively advanced through their eight different states twice, for each complete cycle of the 16 different states that can be assumed by the four bit positions.

Referring once again to FIG. 1, it can be arbitrarily determined that the two-bit counter states are to be decoded to provide output signals over the output lines 20 and 22 at phase times 0 and 1, respectively, without being decoded to provide output signals over the output lines 24 and 26 at phase times 2 and 3. Table III serves to illustrate, in tabular form, the sequence of output signals that would be thus derived.

TABLE III

| Phase | Output Lines 20 | 22 | 24 | 26 |
|---|---|---|---|---|
| 0 | 1 | | | |
| 1 | | 1 | | |
| 2 | | | | |
| 3 | | | | |
| 0 | 1 | | | |
| 1 | | 1 | | |
| 2 | | | | |
| 3 | | | | |

Considering the three-bit counter of FIG. 3 in a similar vein, the eight different counter states may be decoded to only provide output signals over the output lines 44 and 46 at phase times 2 and 3, respectively. Table IV serves to illustrate, in tabular form, the sequence of output signals that would be derived from such a decoding of a three-bit counter.

TABLE IV

| Phase | Output Lines 40 | 42 | 44 | 46 | 48 | 50 | 52 | 54 |
|---|---|---|---|---|---|---|---|---|
| 0 | | | | | | | | |
| 1 | | | | | | | | |
| 2 | | | 1 | | | | | |
| 3 | | | | 1 | | | | |
| 4 | | | | | | | | |
| 5 | | | | | | | | |
| 6 | | | | | | | | |
| 7 | | | | | | | | |
| 0 | | | | | | | | |
| 1 | | | | | | | | |
| 2 | | | 1 | | | | | |
| 3 | | | | 1 | | | | |
| 4 | | | | | | | | |
| 5 | | | | | | | | |
| 6 | | | | | | | | |
| 7 | | | | | | | | |

If a two-bit counter, decoded as indicated in Table III, and a three-bit counter, decoded as indicated in Table IV, are used in combination and initially activated simultaneously to provide a concurrence of phase times, then the output signal sequence detailed by Table V would be obtained.

TABLE V

| 2-bit Counter Phases | 3-bit Counter Phases | Output Lines 20 | 22 | 44 | 46 |
|---|---|---|---|---|---|
| 0 | 0 | 1 | | | |
| 1 | 1 | | 1 | | |
| 2 | 2 | | | 1 | |
| 3 | 3 | | | | 1 |
| 0 | 4 | 1 | | | |
| 1 | 5 | | 1 | | |
| 2 | 6 | | | | |
| 3 | 7 | | | | |
| 0 | 0 | 1 | | | |
| 1 | 1 | | 1 | | |
| 2 | 2 | | | 1 | |
| 3 | 3 | | | | 1 |
| 0 | 4 | 1 | | | |
| 1 | 5 | | 1 | | |
| 2 | 6 | | | | |
| 3 | 7 | | | | |

Table V also serves to exemplify the earlier discussed concept that output signals derived by decoding a two-bit counter will occur at twice the pulse rate of those output signals derived by decoding a three-bit counter. Using the nomenclature introduced hereinabove, the output pulses appearing over the output lines 22 and 24 occur at $4n$ time intervals, while the output pulses appearing over the output lines 44 and 46 occur at $8n$ time intervals.

Taking advantage of the fact that the two least significant bits of a three-bit counter are cycled through exactly the same sequence of states as are the two bits of a two-bit counter, the sequence of output signals or pulses obtained in the example summarized by Table V can be obtained by using a single three-bit counter. This would be accomplished by decoding a three-bit counter to have only four output lines which could be, for example, the output lines 40, 42, 44 and 46 of the decoding matrix 38 shown in FIG. 3. The output lines 40 and 42 would be coupled to decode the four different states of the flip-flop circuit stages 30 and 32, which may be taken to represent the two least significant bits, such that output pulses are derived over the output lines 40 and 42 at phase times 0 and 1, respectively. The output lines 44 and 46 would be coupled to decode the eight different states of all three of the flip-flop circuit stages 30, 32 and 34 such that output pulses are derived over the output lines 44 and 46 at phase times 2 and 3, respectively.

Table VI describes, in tabular form, the relationship between the output pulses and the states of the respective flip-flop circuit stages of such a three-bit counter. The underlined digits in each case designate which of the flip-flop circuit stages have been decoded.

TABLE VI

| Phase | Flip-flop circuit stages 34 | 32 | 30 | Output lines 40 | 42 | 44 | 46 |
|---|---|---|---|---|---|---|---|
| 0 | 0 | $\underline{0}$ | $\underline{0}$ | 1 | | | |
| 1 | 0 | $\underline{0}$ | $\underline{1}$ | | 1 | | |
| 2 | $\underline{0}$ | $\underline{1}$ | $\underline{0}$ | | | 1 | |
| 3 | $\underline{0}$ | $\underline{1}$ | $\underline{1}$ | | | | 1 |
| 4 | 1 | $\underline{0}$ | $\underline{0}$ | 1 | | | |
| 5 | 1 | $\underline{0}$ | $\underline{1}$ | | 1 | | |
| 6 | 1 | 1 | 0 | | | | |
| 7 | 1 | 1 | 1 | | | | |
| 0 | 0 | $\underline{0}$ | $\underline{0}$ | 1 | | | |
| 1 | 0 | $\underline{0}$ | $\underline{1}$ | | 1 | | |
| 2 | $\underline{0}$ | $\underline{1}$ | $\underline{0}$ | | | 1 | |
| 3 | $\underline{0}$ | $\underline{1}$ | $\underline{1}$ | | | | 1 |
| 4 | 1 | $\underline{0}$ | $\underline{0}$ | 1 | | | |
| 5 | 1 | $\underline{0}$ | $\underline{1}$ | | 1 | | |
| 6 | 1 | 1 | 0 | | | | |
| 7 | 1 | 1 | 1 | | | | |

From Table VI, it can also be observed that the output pulses appearing over the output lines 40, 42, 44 and 46 respectively occur at time intervals $4n0$, $4n+1$, $8n+2$, and $8n+3$. It can further be n+the smaller the number of bit positions, or flip-flop circuit states that are decoded, the faster will be the rate at which output pulses will occur. More specifically, it can be now stated as a general rule that the decoding of $m$ bit positions, or flip-flop circuit stages, where $m$ is any integer starting with zero, will yield an output pulse rate of $½^m$ times the clock pulse rate. It can be further stated as a general rule that the particular combined states of the decoded bit positions serve to define the phase times, within a complete counter cycle, at which output pulses will be derived.

Using these general rules as a basis, a notation scheme can be devised wherein a single multibit binary number or word is used to define or designate the number of bit positions, or flip-flop circuit stages, that are to be decoded in order to derive output pulses at a particular pulse rate and at particular phase times in a cycle. Such multibit binary words are hereinafter referred to as "phase/rate" syllables and would include, in a simplified example, one bit position more than the number of bit positions to be decoded. This additional or extra bit position would be situated at the most significant bit position of the phase/rate syllable and would always be a "1" bit. For example, with reference to Table VI, if two bit positions are to be decoded to provide output pulses at time intervals $4n+1$ then the phase/rate syllable would be written as 101. Similarly, if output pulses were desired at time intervals $8n+3$, then the phase/rate syllable would be written as 1011.

This notation scheme can be more generally applied to phase/rate syllables including a number of bits that is greater than the minimum number required to define output pulses which have a particular pulse rate and which occur at particular phase times in a cycle. Such greater numbers of bits would be used to make available a larger selection of output pulse rates. Reconsidering the previous simplified examples, if a phase/rate syllable were to include 9 bits, then output pulses occurring at time intervals $4n+1$ would be defined by a phase/rate syllable written as 000000101 and output pulses occurring at time intervals $8n+3$ would be defined by a phase/rate syllable written as 000001011.

More generally stated, the notation scheme requires that phase/rate syllables include a "1" bit in the $2^m$ bit position, where $m$ flip-flop circuit stages are to be decoded, in order to derive output pulses at a rate of $½^m$ times the clock pulse rate. Referring to the earlier discussed phase/rate syllable, 000001011, as an example, a "1" bit appears at the $2^3$ bit position in that three flip-flop circuit stages must be decoded in order to derive output pulses having a rate of one-eighth ($\frac{1}{2^3}$) the counter clock pulse rate.

It is to be noted that where phase/rate syllables including more than the minimum required number of bits are used, the least significant bit positions are employed to designate the number of flip-flop circuit stages to be decoded and, as such, to define the rate and phase of the derived output pulses. The remaining more significant bit positions are maintained as "0" bits.

It is to be understood that although the foregoing discussion has been limited to a numbering system having a base 2, other numbering systems having a different base are equally adaptive for use with the principles of the present invention.

Figure 4:
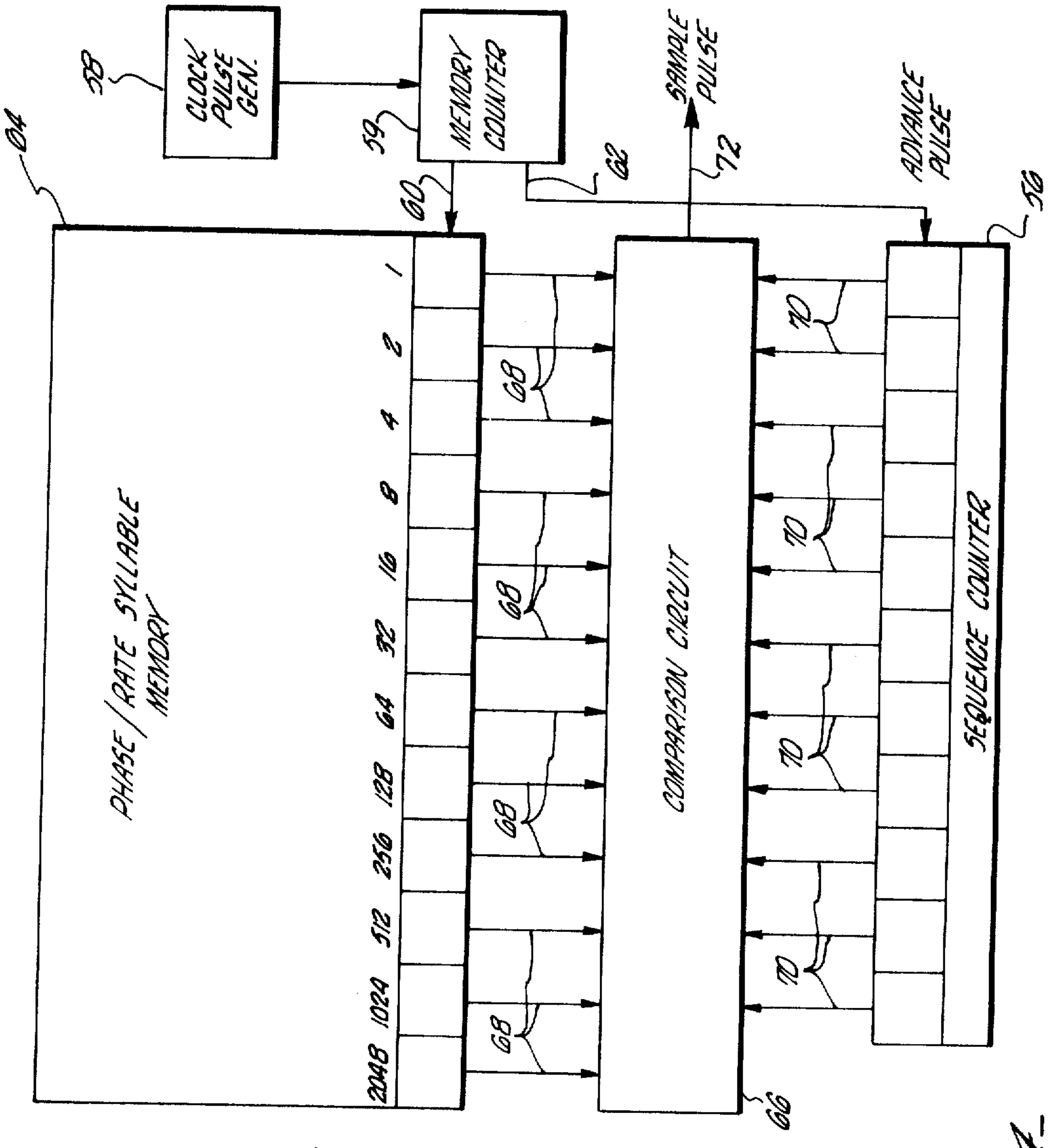
FIG. 4 is a schematic block diagram illustrating a phase/rate syllable network in accordance with the present invention.

FIG. 4 illustrates a phase/rate syllable network that may be used as a part of a data processing system, in accordance with the invention, to generate a repeatable sequence of output pulses at desired pulse rates and phase times.

A digital sequence counter 56 which has 11 bit positions is stepped, or advanced, by the application of a stepping pulse from a recycling digital memory counter 59 over a lead 62. A clock pulse source 58 applies clock pulses to the memory counter 59. The sequence counter 56 is stepped once for each complete cycle of the memory counter 59, at what shall be termed a "sequence counter pulse rate." This stepping serves to sequentially change, or advance, the number in the counter 56 by a single count. For example, if the sequence counter number happens to be 12 (i.e., 000000001100) the application of a stepping pulse to the sequence counter 56 will cause the number therein to be advanced to 13 (i.e., 000000001101). A complete cycle of all of the numbers of the sequence counter 56 is comparable to a complete cycle of the counters of FIGS. 1 and 3. For purposes of a sequence of sampled data, a complete sequence counter cycle defines each repeatable sequence.

A memory 64, which serves to store a plurality of phase/rate syllables, is adapted to receive the contents of the memory counter 59 over a lead 60. Each cycle of the memory counter 59 should include a maximum count equal to the number of phase/rate syllables stored in the memory 64. Application of the contents of the memory counter 59 to the memory 64, at what shall be termed a "memory pulse rate," causes the phase/rate syllables to be successively read from the memory 64 to allow a comparison circuit 66 to compare each of the stored phase/rate syllables with the number in the counter 56. Recycling of the counter 59 produces a recycling of the readout of the memory 64. Where there are 50 phase/rate syllables stored in the memory 56, the "memory pulse rate" will be at least 50 times as fast as the "counter pulse rate."

The phase/rate syllable bits are applied to the comparison circuit 66 over a plurality of leads 68 while the bits representing the number in the sequence counter 56 are applied to the comparison circuit 66 over a plurality of leads 70.

Although the memory 64 is illustrated as having an exemplary 12 readout leads 68 for the purpose of allowing 12-bit phase/rate syllables to be stored, the comparison made by the comparison circuit 66 is in accordance with the earlier discussed scheme and is therefore limited to those bits that occupy bit positions that are less significant than the most significant bit position having a "1" bit. If the compared bits are exactly the same, a sample pulse is generated by the comparison circuit 66 over an output lead 72. In a data ordering system application, a pulse appearing over the lead 72 indicates that an information channel is to be sampled.

Figure 5:
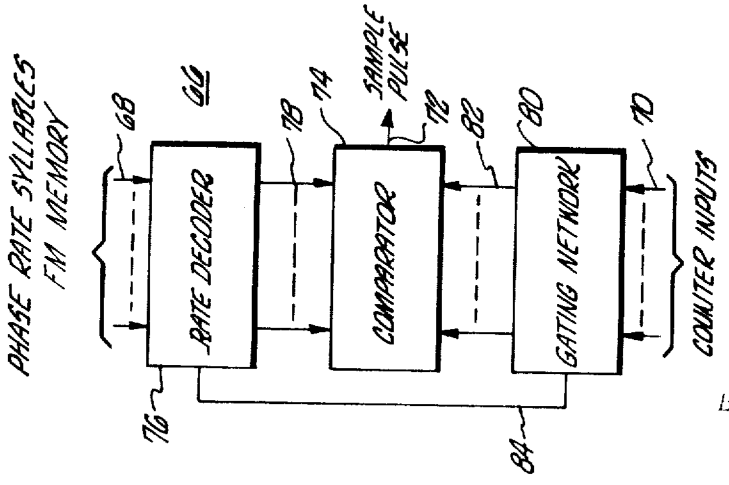
FIG. 5 is a schematic block diagram illustrating a comparison circuit that may be used in connection with the present invention.

A comparison circuit that may be used in connection with the present invention is shown in FIG. 5 and includes a comparator 74, of any conventional design, which is operatively coupled to receive signals from a rate decoder circuit 76 over a plurality of leads 78 and from a gating network 80 over a plurality of leads 82. The phase/rate syllable bits are applied to the rate decoder circuit via the leads 68 while the counter number bits are applied to the gating network 80 via the leads 70.

The rate decoder circuit 76 serves to detect the bit position of the most significant one-bit of the phase/rate syllables applied thereto and gate all of the bits occupying less significant bit positions through to the comparator 74. The rate decoder circuit 76 also serves to control the gating network 80 by the application of signals over a composite lead 84 in order that only the counter number bits corresponding to the detected less significant bit positions of the phase/rate syllable are applied to the comparator 74 to be compared.

Figure 6:
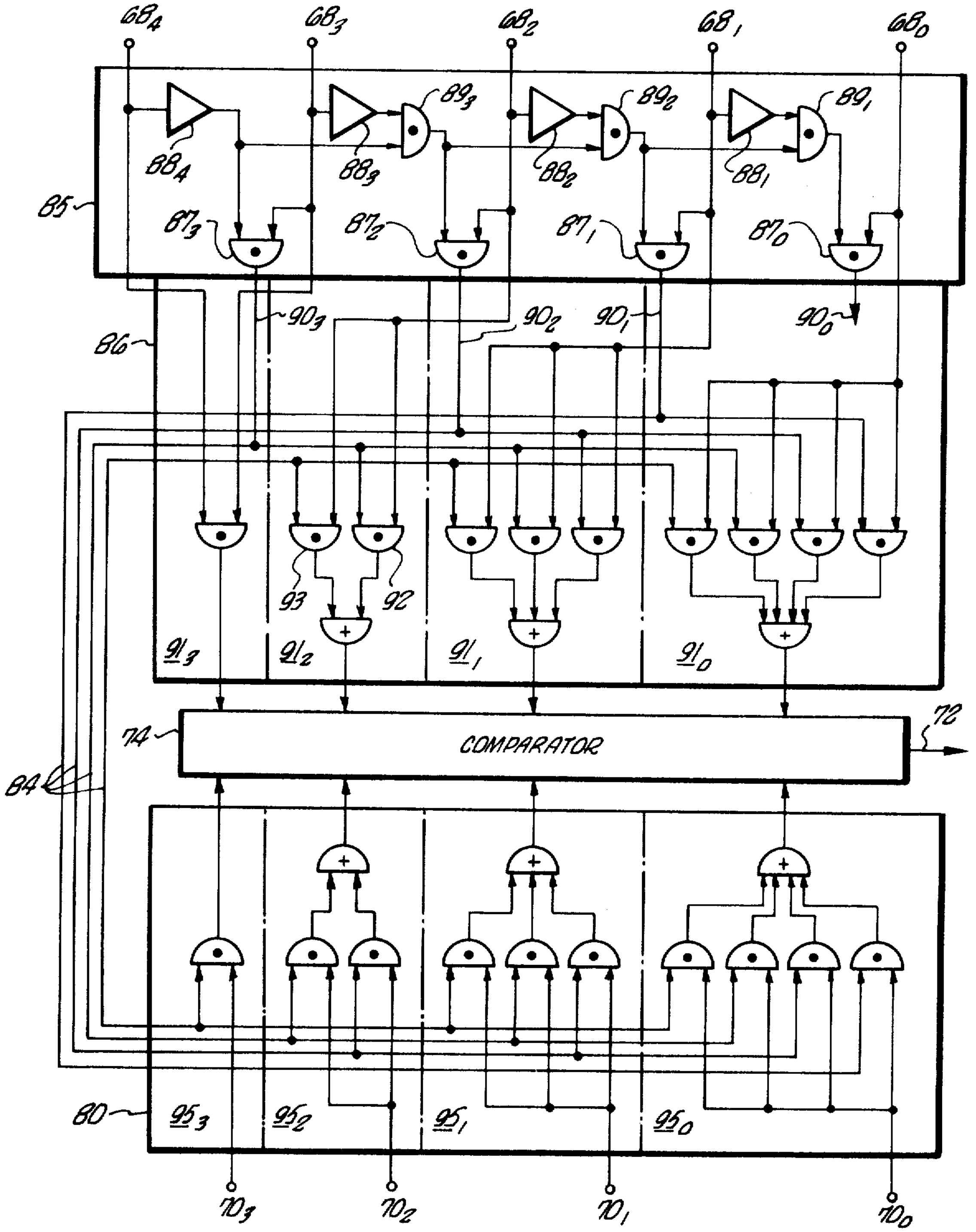
FIG. 6 is a schematic block diagram illustrating an exemplary logic network that may be used as the comparison circuit illustrated in FIG. 4.

An exemplary rate decoder circuit 76 and gating network 80 are illustrated in an operative relationship in the logic block diagram of FIG. 6. As shown, the rate decoder circuit 76 may include a priority network 85 and a decoder gating network 86.

The priority network 85 serves to detect the most significant bit position having a one-bit, of the phase/rate syllables applied thereto, and to appropriately control the decoder gating network 86 to allow all less significant bits to be applied to the comparator 74.

As shown in FIG. 6, four of the exemplary five leads $68_0$, $68_1$, $68_2$ and $68_3$ respectively serve to provide phase/rate syllable bits to a bank of AND-gates $87_0$, $87_1$, $87_2$ and $87_3$, over a first input lead of each AND gate. The most significant bit of a phase/rate syllable is applied directly over the lead $68_4$ to the decoder gating network 86. The bits applied over the leads $68_1$, $68_2$ and $68_3$ are also respectively applied through a bank of inverters $88_1$, $88_2$ and $88_3$ as a first input signal to the AND-gates $89_1$, $89_2$ and $89_3$, the output leads of which are respectively coupled to provide a second input signal to the AND-gates $87_0$, $87_1$ and $87_2$. The AND-gates $89_2$ and $89_3$ are coupled in tandem with the AND-gate $89_1$ such that the output of the AND-gate $89_3$ is applied as a second input to the AND-gate $89_2$, and the output of the AND-gate $89_2$ is applied as a second input to the AND-gate $89_1$. The second input leads of the AND-gates $89_3$ and $87_3$ are coupled through an invertor $88_4$ to receive the bits appearing over the memory lead $68_4$.

Operationally, the most significant bit position having a one-bit will cause a one-bit, designating that bit position, to be applied to the decoder gating network 86. As an example, a one-bit appearing over the lead $68_4$ will be applied directly to the decoder gating network 86 and through the invertor $88_4$, as a zero-bit, to the AND-gates $87_3$ and $89_3$. This zero-bit serves to prevent a one-bit from appearing as an output of the AND-gates $87_3$, $87_2$, $87_1$, and $87_0$ which represent less significant bit positions. If the most significant one-bit appears over the lead $68_3$, a zero-bit appearing over the lead $68_4$, then both inputs of the AND-gate $87_3$ will be one-bits and the output of the AND-gate $87_3$ will therefore be a one-bit. In a manner similar to that earlier discussed, the AND-gates $87_2$, $87_1$ and $87_0$, representing less significant bit positions, will be prevented from having a one-bit as an output by the application of a zero-bit as an input to the AND-gate $89_3$ through the invertor $88_3$.

A one-bit at the output of the AND-gate $87_0$ indicates that the least significant bit position has the only one-bit in a multibit word. This can be intended to cause the corresponding information channel to be continually sampled, or controlled, upon each changing of the sequence counter number.

Considering now the decoder gating network 86, a signal designating the most significant bit position appearing as a one-bit in the phase/rate syllables is applied to the decoder gating network 86 over the lead $68_4$ or over one of the respective output leads $90_3$, $90_2$, $90_1$ or $90_0$ of the AND-gates $87_3$, $87_2$, $87_1$ and $87_0$.

The one-bit applied over one of the leads $68_4$, $90_3$, $90_2$, $90_1$ or $90_0$ will, as earlier mentioned, serve to enable all gating circuits associated with less significant bit positions such that bits of the phase/rate syllable are applied to the comparator 74.

As illustrated, an array of gating circuits $91_0$, $91_1$, $91_2$ and $91_3$ form the decoder gating network 86. It may be noted at this point that no gating circuit is required for the most significant bit position of the phase/rate syllable in that this bit position, if employed, will always serve to designate all less significant bits for application to the comparator 74.

Generally considered, the gating circuits $91_0$, $91_1$, $91_2$, and $91_3$ must include a plurality of AND gates that are equal in number to the number of bit positions that are more significant than the bit position associated with the particular gating circuit. An OR gate must be employed to transmit the outputs of the respective AND gates to the comparator 74 whenever there is more than one such AND gate included in the gating circuit. Each of the AND gates have a first input lead coupled directly to the memory 64 to receive phase/rate syllable bits. The second input to the AND gates are coupled to receive enabling signals, from the priority network 85, corresponding to each of the more significant bit positions.

Considering the gating circuit $91_2$ in greater detail and as a typical example, it is shown to include the AND-gates 92 and 93 which each have a first input thereof coupled to receive phase/rate syllable bits provided over the lead $68_2$. The second input leads thereof are respectively coupled to receive enabling signals, corresponding to the two more significant bit positions, over the leads $90_3$ and $68_4$. The outputs of both of the AND-gates 92 and 93 are coupled through the OR-gate 94 to the comparator 74.

It is clear that if an enabling signal appears over either the lead $68_4$ or the lead $90_3$, then the gating circuit $91_2$ will allow the phase/rate syllable bit applied to the gating circuit $91_2$ over the lead $68_2$ to be accordingly applied as an input to the comparator 74.

Considering the gating circuit $91_1$ as a further example, if an enabling signal should appear at any of the leads $68_4$, $90_3$ or $90_2$, then the gating circuit $91_1$ will allow the phase/rate syllable bit applied thereto over the lead $68_1$ to be accordingly applied as an input to the comparator 74.

From the illustration of FIG. 6, it may be observed that the sequence counter gating network 80 is a mirror image of the decoder gating network 86. The only difference is that instead of receiving phase/rate syllable bits as input signals, the sequence counter gating network receives bits representing a number in the sequence counter 56. This allows the sequence counter gating network 80 to allow the same number of sequence counter bits to pass to the comparator 74 as there are phase/rate syllable bits applied to the comparator 74.

Figure 7:
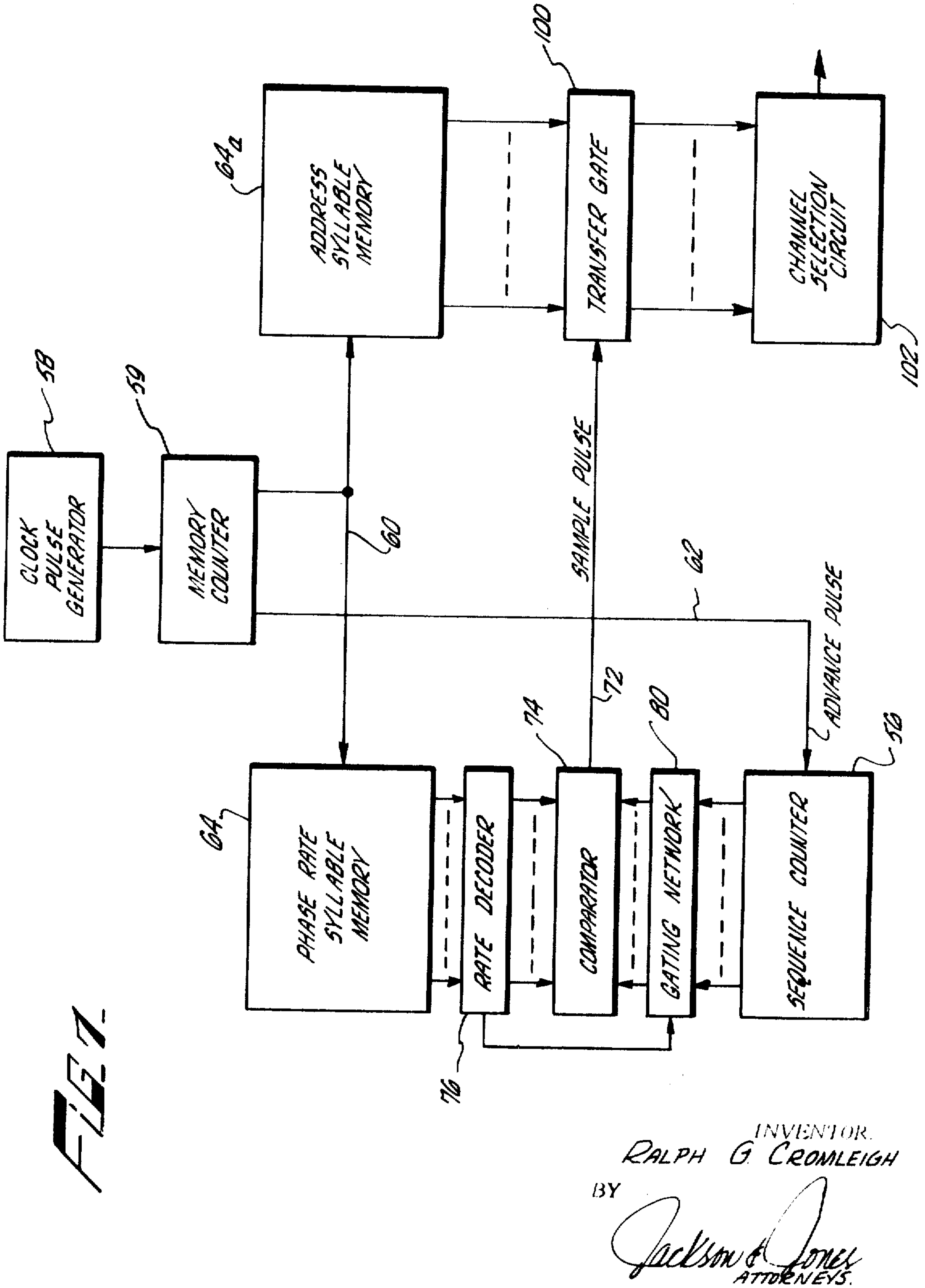
FIG. 7 is a schematic block diagram illustrating a digital data processing system in accordance with the present invention.

Turning now to FIG. 7, a data processing system, in accordance with the present invention, is illustrated as including the phase/rate syllable network of FIG. 4 in addition to an address syllable memory 64*a*, a transfer gate 100 and a channel selection circuit 102.

The address syllable memory 64*a* may be a portion of the same memory in which phase/rate syllables are stored, despite being illustrated as a separate component, in that the address syllable memory 64*a* is intended to store one address syllable for each of the phase/rate syllables that are stored in the memory 64. Associated address syllables and phase/rate syllables may be considered to form the earlier mentioned multibit words which relate to a particular one of a plurality of information channels over which data to be sampled is provided.

To this end, the recycling memory counter 59, in the illustrated embodiment, also serves to apply the contents thereof to the address memory 64*a* over the lead 60 such that address syllables and associated phase/rate syllables are simultaneously read from the address memory 64*a* and the phase/rate memory 64, respectively. The address syllables read from the memory 64*a* are applied to the transfer gate 100 over a plurality of leads 104 and are allowed to be applied therefrom to the channel selection circuit 102 only upon the application of a sample pulse to the transfer gate 100 from the comparator 74 over the lead 72.

The use of an address syllable memory 64*a* is particularly beneficial where a large number of information channels and a consequent large number of address syllables are involved. Particularly in situations where a much smaller number of information channels are involved, the address syllable memory 64*a* may be eliminated, by simply applying the contents of the memory counter 59 directly to the transfer gate 100. In such an embodiment, each count of the memory counter 59 would correspond to a particular information channel.

The channel selection circuit 102, upon the application of an address syllable, or address count, serves to enable the sampling, or distribution, of data over the information channel to which the address corresponds. This may be accomplished, for example, by the transmission of instruction signals to the individual information channels in the same manner as is employed in a conventional telephone exchange. Data could then be acquired from the individual information channels in a fashion common to present day teletypewriter channels. In that the specific mechanics of obtaining data from the information channels is not intended as a part of this invention, no further discussion of the various conventional alternatives will be included herein.

From the foregoing discussion, it can now be appreciated that data may be sampled from, or distributed to, a particular information channel whenever the least significant digits, or bit positions, of a number in the sequence counter 56 are exactly the same as the lesser significant bits, designated by the most significant "1" bit, of a phase/rate syllable. It can be further appreciated that the sequence of sampled or distributed data will be in accordance with the rates and phase times determined by the phase/rate syllables stored in the memory 64.

In that only a single multibit word need be stored in memory for each of the information channels, it is clear that a vast savings in total required memory capacity is obtained by using this invention. Additionally, the rate at which data is to be sampled from, or distributed to, any particular information channel can be easily changed to meet new requirements by simply altering the bit position of the most significant one-bit.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the present invention may be made.

What is claimed is:

1. A data processing system for controlling the rate and time at which data is sampled from or distributed to a plurality of information channels, said system comprising:
   - a memory for storing multibit words including a phase/rate syllable, each of said multibit words being associated with a particular one of said information channels;
   - a multibit sequence counter for providing a succession of uniformly increasing multibit numbers; and
   - a comparison circuit, operatively connected to said memory and to said counter, for comparing a varying predefined number of least significant bits of each of said phase/rate syllables with a corresponding number of at least significant bits of each successive multibit number in said counter.

2. The apparatus defined by claim 1 further including a memory counter for applying stepping pulses to said multibit sequence counter and the contents of said memory counter to said memory, whereby the contents of said memory counter is sequentially applied to said memory at a rate allowing every multibit word to be successively read from said memory for each increase of the number in said multibit counter.

3. The apparatus defined by claim 1 wherein said multibit words further include address syllables, said apparatus further including a transfer gate to which said address syllables are successively applied from said memory.

4. The apparatus defined by claim 1 wherein said comparison circuit provides a sample pulse in response to each favorable comparison of said least significant bits of said phase/rate syllables with said least significant bits of said multibit numbers in said multibit sequence counter.

5. The apparatus defined by claim 4 wherein said multibit words further include address syllables, said apparatus further including:
   - a channel selection circuit, operatively coupled to said information channels, for selectively enabling said data to be sampled from, or distributed to, said information channels; and transfer gating means, operatively coupled to said comparison circuit, for selectively transfering a particular one of said address syllables from said memory to said channel selection circuit in response to the application of said sample pulse.

6. The apparatus defined by claim 1 wherein said comparison circuit comprises:

a comparator for comparing sets of bits applied thereto from said memory and said counter;

counter gating means for selectively applying a varying predetermined number of said least significant bits of said multibit numbers in said counter to said comparator; and decoder means for detecting and applying said predefined number of least significant bits of said phase/rate syllables to said comparator and for controlling said counter gating means to apply the same number of least significant bits of said multibit numbers in said counter to said comparator.

7. The apparatus defined by claim 1 wherein said phase/rate syllables each include a plurality of bits among which the most significant bit appearing as a one designates all less significant bits for application to said comparison circuit, said comparison circuit including:

a comparator for generating a sample pulse in response to a valid comparison of phase/rate bits and counter number bits applied thereto;

decoder means for detecting said most significant bit appearing as a one and applying all lesser significant bits of said phase/rate syllables to said comparator; and counter gating means for applying to said comparator from said counter a number of least significant bits of said multibit number equal to the number of lesser significant bits of said phase/rate syllable applied by said decoder means from said memory to said comparator.

8. The apparatus defined by claim 7 wherein said multibit words further include address syllables, said apparatus further including:

a channel selection circuit, operatively coupled to said information channels, for selectively allowing said data to be sampled from, or distributed to, said information channels; and transfer gating means, operatively coupled to said comparator, for selectively transferring a particular one of said address syllables from said memory to said channel selection circuit in response to a sample pulse generated by said comparator.

9. The apparatus defined by claim 8 further including a memory counter for applying stepping pulses to said multibit sequence counter and the contents of said memory counter to said memory, whereby the contents of said memory counter is sequentially applied to said memory at a rate allowing every phase/rate syllable to be successively applied to said comparator and associated address syllables to be successively applied to said transfer gating means, for each increase of the number in said multibit sequence counter.

10. A data processing system for defining the rates and times at which data is applied over, or sampled from, particular information channels included in a multichannel system by providing control signals, said data processing system comprising:

memory means for storing multibit words defining the rate and times at which said control signals are provided;

sequencing means for cyclically providing a succession of different multibit numbers; and comparison means, operatively connected to said memory means for comparing a predetermined portion of each of said different multibit numbers with a predetermined portion of every multibit word defining the rate and times at which said control signals are provided and for providing a control signal whenever compared predetermined portions of said different multibit number and said multibit words are identical.

11. The apparatus according to claim 10 wherein said multibit words stored in said memory means each include a predetermined number of bits arranged in positions having an increasing or decreasing gradient of significance, each bit having a high level or a low level, the high level bit occupying the most significant position serving to define the rate at which said control signals are provided and all bits occupying lesser significant positions than said high level bit serving to define the times at which said control signals are provided, said comparison means comprising:

a comparator for providing said control signals whenever the bits compared thereby are identical;

decoder means for receiving said multibit words from said memory means and for applying to said comparator only those bits, of said multibit words, occupying said lesser significant positions; and gating means for receiving said different multibit numbers from said sequencing means and for applying to said comparator only those bits, of said different multibit numbers, occupying positions corresponding in significance to said lesser significant positions occupied by said bits of multibit words.

12. The apparatus according to claim 11 further including means for providing address signals corresponding to the respective information channels included in a multichannel system.

13. The apparatus according to claim 12 further including:

selection means, responsive to said address signals, for applying enabling signals to said particular information channels to enable the distribution of data thereto or the sampling of data therefrom; and transfer means, responsive to said control signals, for enabling said address signals to be applied to said selection means.

* * * * *